(12) United States Patent
Abrishamkar et al.

(10) Patent No.: US 8,665,971 B2
(45) Date of Patent: Mar. 4, 2014

(54) APPARATUS AND METHOD FOR CHANNEL ESTIMATION USING COMPRESSIVE SENSING

(75) Inventors: Farrokh Abrishamkar, San Diego, CA (US); Ori Shental, Haifa (IL); Ni-Chun Wang, San Diego, CA (US); Yingqun Yu, San Diego, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 435 days.

(21) Appl. No.: 12/950,412

(22) Filed: Nov. 19, 2010

(65) Prior Publication Data

US 2011/0286498 A1    Nov. 24, 2011

Related U.S. Application Data

(60) Provisional application No. 61/236,885, filed on Nov. 24, 2009, provisional application No. 61/263,891, filed on Nov. 24, 2009.

(51) Int. Cl.
*H04L 27/28* (2006.01)

(52) U.S. Cl.
USPC ......................................... 375/260

(58) Field of Classification Search
USPC ......................................... 375/260
See application file for complete search history.

(56) References Cited

U.S. PATENT DOCUMENTS

| 7,436,912 | B2 | 10/2008 | Fudge et al. |
| 7,583,755 | B2 | 9/2009 | Ma et al. |
| 8,213,525 | B2 | 7/2012 | Caire et al. |
| 8,218,658 | B2 | 7/2012 | Hung et al. |
| 8,243,860 | B1 | 8/2012 | Lee et al. |
| 8,305,843 | B2 | 11/2012 | Dahl et al. |
| 8,320,489 | B2 * | 11/2012 | Bajwa et al. ............. 375/267 |
| 2005/0281324 | A1 | 12/2005 | Wallen |
| 2009/0222226 | A1 | 9/2009 | Baraniuk et al. |
| 2010/0182950 | A1 | 7/2010 | Sexton et al. |
| 2010/0310011 | A1 | 12/2010 | Sexton et al. |
| 2011/0006768 | A1 | 1/2011 | Ying et al. |
| 2011/0043710 | A1 | 2/2011 | Samarasooriya et al. |
| 2011/0286507 | A1 | 11/2011 | Yu et al. |
| 2011/0286558 | A1 | 11/2011 | Abrishamkar et al. |

FOREIGN PATENT DOCUMENTS

TW          200939711 A     9/2009

OTHER PUBLICATIONS

Akansu A N, et al., "Emerging applications of wavelets: A review", Physical Communication, vol. 3, No. 1, Mar. 1, 2010, pp. 1-18, XP026833161, ISSN: 1874-4907 [retrieved on Jul. 9, 2009].

Berger C R, et al., "Sparse channel estimation for multicarrier underwater acoustic communication: From subspace methods to compressed sensing", OCEANS 2009—Europe, 2009. OCEANS '09, IEEE, Piscataway, NJ, USA, May 11, 2009, pp. 1-8, XP031540788, ISBN: 978-1-4244-2522-8.

(Continued)

*Primary Examiner* — Kevin Kim
(74) *Attorney, Agent, or Firm* — Stanton Braden

(57) ABSTRACT

An apparatus and method for channel estimation comprising obtaining a response matrix G(l) using Q quantity pilots; constructing a sensing matrix $W_{sensing}$ based on K quantity tones, L quantity symbols and P quantity multipaths; and using compressive sensing channel estimation to determine an equivalent channel matrix $G_p(i)$ based on the response matrix G(l) and the sensing matrix $W_{sensing}$.

40 Claims, 10 Drawing Sheets

(56) References Cited

OTHER PUBLICATIONS

Berger C R, et al., "Sparse channel estimation for OFDM: Overcomplete dictionaries and super-resolution", Signal Processing Advances in Wireless Communications, 2009. SPAWC '09. IEEE 10th Workshop on, IEEE, Piscataway, NJ, USA, Jun. 21, 2009, pp. 196-200, XP031487816, ISBN: 978-1-4244-3695-8.

Bie Zhisong, et al., "Sparsity-based channel state information acquisition and feedback scheme for MIM0-0FDMA systems", Global Mobile Congress 2009, IEEE, Piscataway, NJ, USA, Oct. 12, 2009, pp. 1-4, XP031551162, ISBN: 978-1-4244-5302-3.

Caire G, et al., "Impulse noise cancellation in OFDM: an application of compressed sensing", Information Theory, 2008. ISIT 2008. IEEE International Symposium on, IEEE, Piscataway, NJ, USA, Jul. 6, 2008, pp. 1293-1297, XP031303118, ISBN: 978-1-4244-2256-2.

Christian D Austin, et al., "On the Relation Between Sparse Sampling and Parametric Estimation", Digital Signal Processing Workshop and 5th IEEE Signal Processing Education Workshop, 2009. DSP/SPE 2009. IEEE 13th, IEEE, Piscataway, NJ, USA, Jan. 4, 2009, pp. 387-392, XP031425875, ISBN: 978-1-4244-3677-4.

Figueiredo M.A.T., et al., "Gradient Projection for Sparse Reconstruction: Application to Compressed Sensing and Other Inverse Problems," IEEE Journal of Selected Topics in Signal Processing, Dec. 1, 2007, pp. 586-597, vol. 1 (4), XP011199163.

Georg Taubock, et al., "A compressed sensing technique for OFDM channel estimation in mobile environments: Exploiting channel sparsity for reducing pilots", Acoustics, Speech and Signal Processing, 2008, ICASSP 2008, IEEE International Conference on, IEEE, Piscataway, NJ, USA, Mar. 31, 2008, pp. 2885-2888, XP031251194, ISBN: 978-1-4244-1483-3.

International Search Report and Written Opinion—PCT/US2010/057775—ISA/EPO—Apr. 27, 2011.

Lei Huang, et al., "MMSE-Based MDL Method for Robust Estimation of Number of Sources Without Eigendecomposition", IEEE Transactions on Signal Processing, IEEE Service Center, New York, NY, US, vol. 57, No. 10, Oct. 1, 2009, pp. 4135-4142, XP011269156, ISSN: 1053-587X, DOI: DOI:10.1109/TSP.2009.2024043.

Miosso C J, et al., "Compressive Sensing Reconstruction With Prior Information by Iteratively Reweighted Least-Squares", IEEE Transactions on Signal Processing, IEEE Service Center, New York, NY, US, vol. 57, No. 6, Jun. 1, 2009, pp. 2424-2431, XP011253189, ISSN: 1053-587X.

Nguyen, L.T., et al., "Compressed Sensing using Chaos Filters", 2008, IEEE, pp. 219-223.

Paredes J.L., et al., "Ultra-Wideband Compressed Sensing: Channel Estimation", IEEE Journal of Selected Topics in Signal Processing, IEEE, Oct. 1, 2007, US, pp. 383-395, vol. 1 (3), XP011193162, ISSN: 1932-4553, DOI: DOI:10.1109/JSTSP.2007.906657.

Soltanolkotabi M, et al., "A practical sparse channel estimation for current OFDM standards", Telecommunications, 2009, ICT 09, International Conference on, IEEE, Piscataway, NJ, USA, May 25, 2009, pp. 217-222, XP031485728, ISBN: 978-1-4244-2936-3.

Tropp, J.A., et al., "Random Filters for Compressive Sampling and Reconstruction", 2006, IEEE, pp. 872-875.

Waheed Bajwa U, et al., "Sparse Multipath Channels: Modeling and Estimation", Digital Signal Processing Workshop and 5th IEEE Signal Processing Education Workshop, 2009, DSP/SPE 2009, IEEE 13th, IEEE, Piscataway, NJ, USA, Jan. 4, 2009, pp. 320-325, XP031425863, ISBN: 978-1-4244-3677-4.

Waheed U Bajwa, et al., "Learning sparse doubly-selective channels", Communication, Control, and Computing, 2008 46th Annual Allerton Conference on, IEEE, Piscataway, NJ, USA, Sep. 23, 2008, pp. 575-582, XP031435206, ISBN: 978-1-4244-2925-7.

Yaghoobi M, et al., "Compressible dictionary learning for fast sparse approximations", Statistical Signal Processing, 2009, SSP '09. IEEE/SP 15th Workshop on, IEEE. Piscataway, NJ, USA, Aug. 31, 2009, pp. 662-665, XP031540999, ISBN: 978-1-4244-2709-3.

Yilun Chen, et al., "Sparse LMS for System Identification", Proceeding ICASSP '09 Proceedings of the 2009 IEEE International Conference on Acoustics, Speech and Signal Processing, 2009, pp. 1-4, IEEE Computer Society.

Zayyani H, et al., "Compressed sensing Block MAP-LMS adaptive filter for sparse channel estimation and a Bayesian Cramer-Rao bound", Machine Learning for Signal Processing, 2009. MLSP 2009. IEEE International Workshop on, IEEE, Piscataway, NJ, USA, Sep. 1, 2009, pp. 1-6, XP031557793, ISBN: 978-1-4244-4947-7.

Zhongmin Wang, et al., "Compressed Detection for Pilot Assisted Ultra-Wideband Impulse Radio", Ultra-Wideband, 2007. ICUWB 2007. IEEE International Conference on, IEEE, PI, Sep. 1, 2007, pp. 393-398, XP031159382, ISBN: 978-1-4244-0520-6.

Taiwan Search Report—TW099140418—TIPO—Apr. 20, 2013.

* cited by examiner

APPARATUS AND METHOD FOR CHANNEL ESTIMATION USING COMPRESSIVE SENSING

CLAIM OF PRIORITY UNDER 35 U.S.C. §119

The present Application for patent claims priority to Provisional Application No. 61/263,885 entitled Channel Estimation Using Compressive Sensing for LTE and WiMax filed Nov. 24, 2009, and WiMax filed Nov. 24, 2009, and 61/263,891, entitled CSCE Using Taylor Series Expansion, filed Nov. 24, 2009, and assigned to the assignee hereof and hereby expressly incorporated by reference herein.

FIELD

This disclosure relates generally to apparatus and methods for channel estimation in wireless communication. More particularly, the disclosure relates to channel estimation for orthogonal frequency division multiplexing (OFDM) wireless systems using compressive sensing techniques.

BACKGROUND

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, $3^{rd}$ Generation Partnership Project (3GPP) Long Term Evolution (LTE) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-input single-output (SISO), multiple-input single-output (MISO) or a multiple-input multiple-output (MIMO) system.

SUMMARY

Disclosed is an apparatus and method for channel estimation using compressive sensing. According to one aspect, a method for channel estimation comprising obtaining a response matrix G(l) using Q quantity pilots; constructing a sensing matrix $W_{sensing}$ based on K quantity tones, L quantity symbols and P quantity multipaths; and using compressive sensing channel estimation to determine an equivalent channel matrix $G_p(i)$ based on the response matrix G(l) and the sensing matrix $W_{sensing}$.

According to another aspect, an apparatus for channel estimation comprising a processor and a memory, the memory containing program code executable by the processor for performing the following: obtaining a response matrix G(l) using Q quantity pilots; constructing a sensing matrix $W_{sensing}$ based on K quantity tones, L quantity symbols and P quantity multipaths; and using compressive sensing channel estimation to determine an equivalent channel matrix $G_p(i)$ based on the response matrix G(l) and the sensing matrix $W_{sensing}$.

According to another aspect, an apparatus for channel estimation comprising means for obtaining a response matrix G(l) using Q quantity pilots; means for constructing a sensing matrix $W_{sensing}$ based on K quantity tones, L quantity symbols and P quantity multipaths; and means for using compressive sensing channel estimation to determine an equivalent channel matrix $G_p(i)$ based on the response matrix G(l) and the sensing matrix $W_{sensing}$.

According to another aspect, a computer-readable medium for channel estimation, the computer-readable medium storing a computer program, wherein execution of the computer program is for: obtaining a response matrix G(l) using Q quantity pilots; constructing a sensing matrix $W_{sensing}$ based on K quantity tones, L quantity symbols and P quantity multipaths; and using compressive sensing channel estimation to determine an equivalent channel matrix $G_p(i)$ based on the response matrix G(l) and the sensing matrix $W_{sensing}$.

Advantages of the present disclosure may include increased performance and efficiency in the case of channel sparsity.

It is understood that other aspects will become readily apparent to those skilled in the art from the following detailed description, wherein it is shown and described various aspects by way of illustration. The drawings and detailed description are to be regarded as illustrative in nature and not as restrictive.

DETAILED DESCRIPTION

Figure 1:
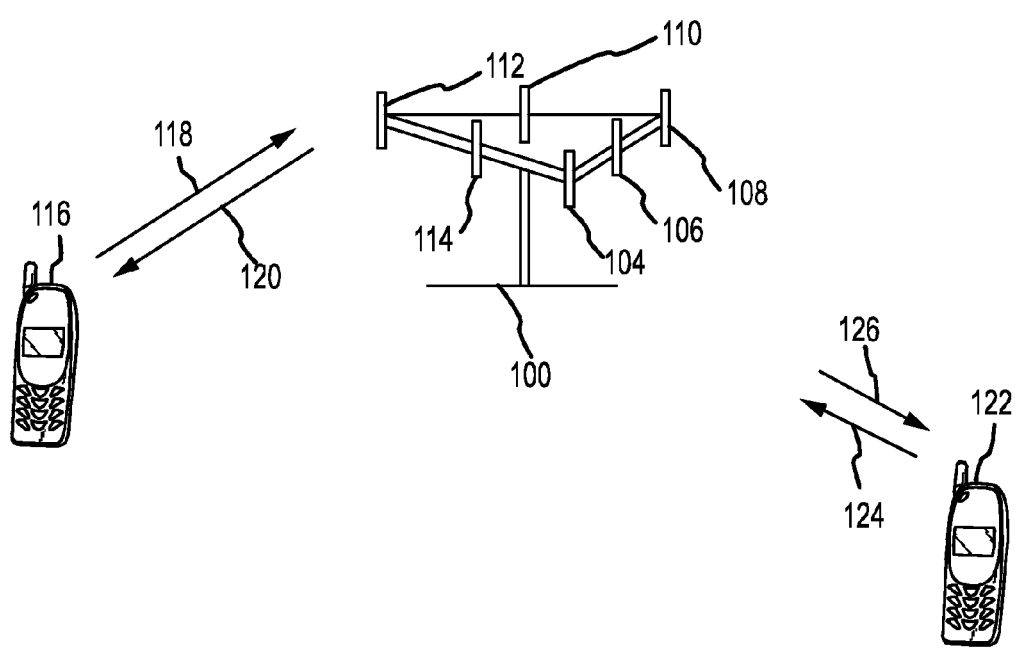
FIG. 1 illustrates an example multiple access wireless communication system according to one example.

The detailed description set forth below in connection with the appended drawings is intended as a description of various aspects of the present disclosure and is not intended to represent the only aspects in which the present disclosure may be practiced. Each aspect described in this disclosure is provided merely as an example or illustration of the present disclosure, and should not necessarily be construed as preferred or advantageous over other aspects. The detailed description includes specific details for the purpose of providing a thorough understanding of the present disclosure. However, it will be apparent to those skilled in the art that the present disclosure may be practiced without these specific details. In some instances, well-known structures and devices are shown in block diagram form in order to avoid obscuring the concepts of the present disclosure. Acronyms and other descriptive terminology may be used merely for convenience and clarity and are not intended to limit the scope of the present disclosure.

While for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). Cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below.

Single carrier frequency division multiple access (SC-FDMA), which utilizes single carrier modulation and frequency domain equalization is a transmission technique. SC-FDMA has similar performance and essentially the same overall complexity as those of an OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for uplink multiple access scheme in 3GPP Long Term Evolution (LTE), or Evolved UTRA.

Referring to FIG. 1, a multiple access wireless communication system according to one embodiment is illustrated. An access point 100 (AP) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal 122 is in communication with antennas 106 and 108, where antennas 106 and 108 transmit information to access terminal 122 over forward link 126 and receive information from access terminal 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access point. In the embodiment, antenna groups each are designed to communicate to access terminals in a sector of the areas covered by access point 100.

In communication over forward links 120 and 126, the transmitting antennas of access point 100 utilize beamforming in order to improve the signal-to-noise ratio of forward links for the different access terminals 116 and 124. Also, an access point using beamforming to transmit to access terminals scattered randomly through its coverage causes less interference to access terminals in neighboring cells than an access point transmitting through a single antenna to all its access terminals.

An access point may be a fixed station used for communicating with the terminals and may also be referred to as an access point, a Node B, an eNodeB or some other terminology. An access terminal may also be called a mobile terminal, a mobile device, a user equipment (UE), a wireless communication device, terminal, access terminal or some other terminology.

Figure 2:
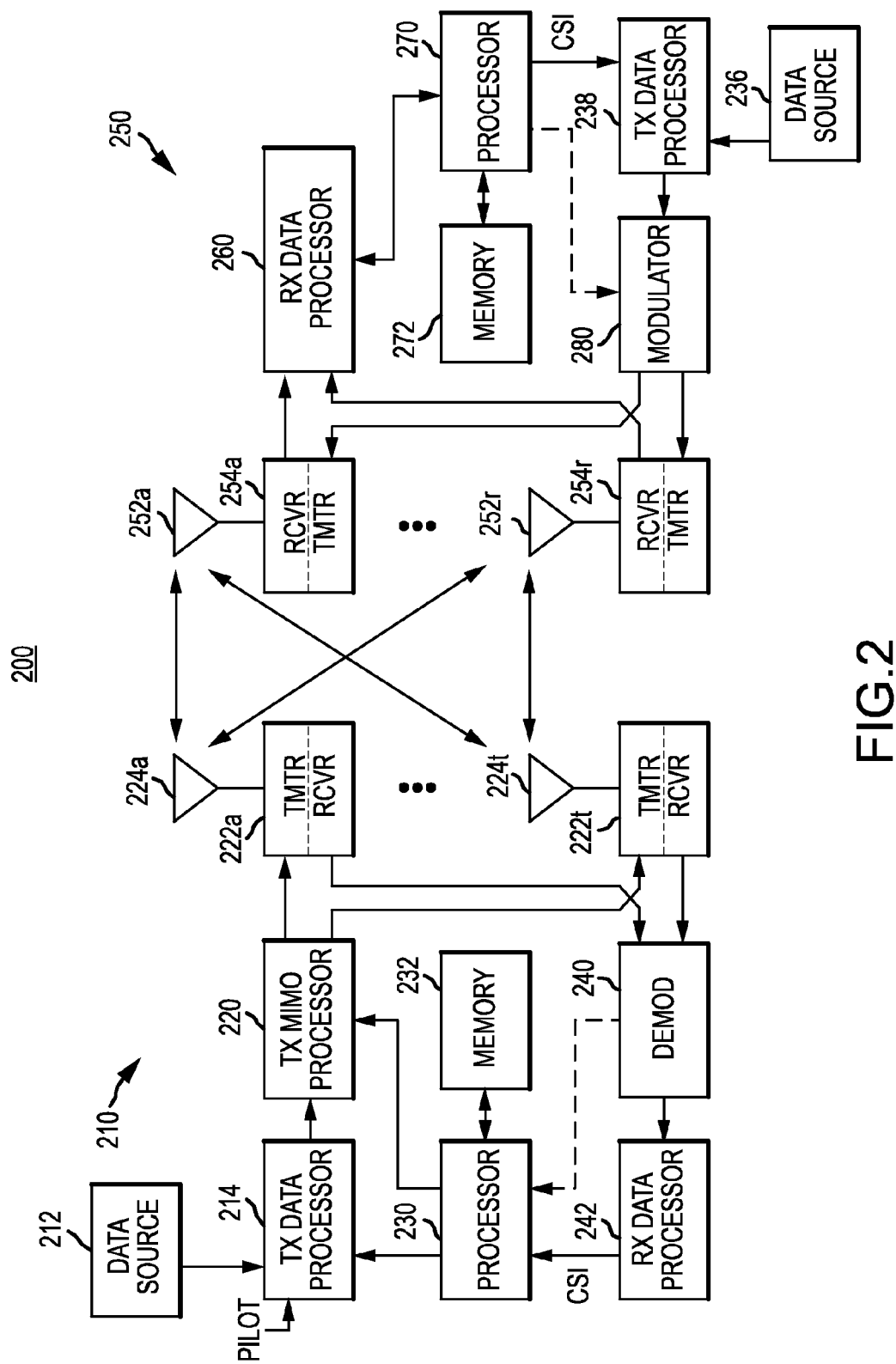
FIG. 2 illustrates an example block diagram of a transmitter system (also known as access point) and a receiver system (also known as access terminal) in a multiple input multiple output (MIMO) system.

FIG. 2 illustrates an example block diagram of a transmitter system 210 (also known as access point) and a receiver system 250 (also known as access terminal) in a multiple input multiple output (MIMO) system 200. At the transmitter system 210, traffic data for a number of data streams is provided from a data source 212 to a transmit (TX) data processor 214.

In an embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
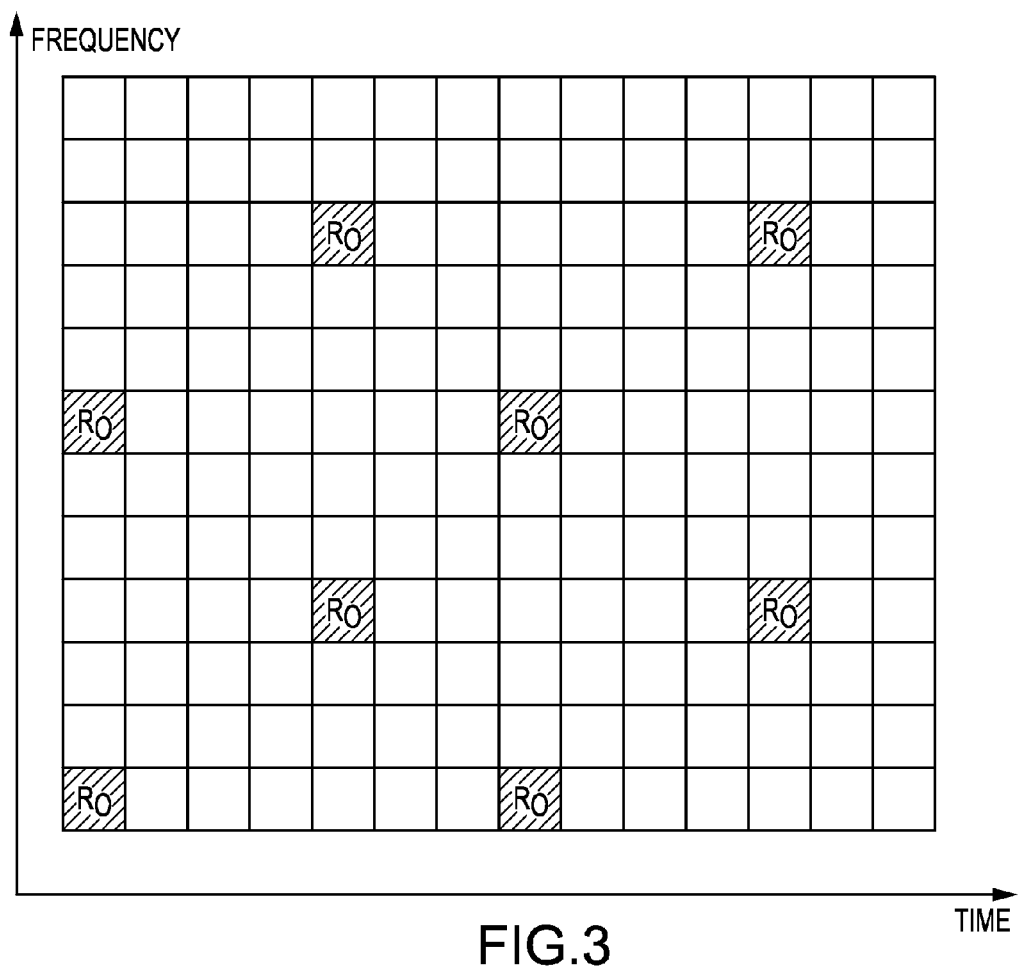
FIG. 3 illustrates an example cell-specific reference signal (RS) arrangement with a normal cyclic prefix (CP) length.

In one aspect, the LTE downlink provides reference signals (RSs), i.e., pilots, within certain locations within an OFDM time-frequency lattice. For example, FIG. 3 illustrates an example cell-specific RS arrangement with a normal cyclic prefix (CP) length. As shown, the RS symbols are shown staggered in the time dimension and frequency dimension according to the expected channel coherence bandwidth and maximum Doppler spread, respectively.

In an aspect, logical channels are classified into Control Channels and Traffic Channels. Logical Control Channels comprises Broadcast Control Channel (BCCH) which is DL channel for broadcasting system control information. Paging Control Channel (PCCH) which is DL channel that transfers paging information. Multicast Control Channel (MCCH) which is Point-to-multipoint DL channel used for transmitting Multimedia Broadcast and Multicast Service (MBMS) scheduling and control information for one or several MTCHs. Generally, after establishing RRC connection this channel is only used by UEs that receive MBMS (Note: old MCCH+MSCH). Dedicated Control Channel (DCCH) is Point-to-point bi-directional channel that transmits dedicated control information and used by UEs having an RRC connection. In one aspect, Logical Traffic Channels comprises a Dedicated Traffic Channel (DTCH) which is Point-to-point bi-directional channel, dedicated to one UE, for the transfer of user information. Also, a Multicast Traffic Channel (MTCH) for Point-to-multipoint DL channel for transmitting traffic data.

In an aspect, Transport Channels are classified into downlink (DL) and uplink (UL). DL Transport Channels comprises a Broadcast Channel (BCH), Downlink Shared Data Channel (DL-SDCH) and a Paging Channel (PCH), the PCH for support of UE power saving (DRX cycle is indicated by the network to the UE), broadcasted over entire cell and mapped to PHY resources which can be used for other control/traffic channels. The UL Transport Channels comprises a Random Access Channel (RACH), a Request Channel (REQCH), a Uplink Shared Data Channel (UL-SDCH) and plurality of PHY channels. The PHY channels comprise a set of DL channels and UL channels.

In one aspect, the DL PHY channels may comprise one or more of the following:
Common Pilot Channel (CPICH)
Synchronization Channel (SCH)
Common Control Channel (CCCH)
Shared DL Control Channel (SDCCH)
Multicast Control Channel (MCCH)
Shared UL Assignment Channel (SUACH)
Acknowledgement Channel (ACKCH)
DL Physical Shared Data Channel (DL-PSDCH)
UL Power Control Channel (UPCCH)
Paging Indicator Channel (PICH)
Load Indicator Channel (LICH)

In one aspect, the UL PHY channels may comprise one or more of the following:
Physical Random Access Channel (PRACH)
Channel Quality Indicator Channel (CQICH)
Acknowledgement Channel (ACKCH)
Antenna Subset Indicator Channel (ASICH)
Shared Request Channel (SREQCH)
UL Physical Shared Data Channel (UL-PSDCH)
Broadband Pilot Channel (BPICH)

In one aspect, a channel structure is provided that preserves low peak to average power ratio (PAPR) properties of a single carrier waveform (i.e., at any given time, the channel is contiguous or uniformly spaced in frequency).

For the purposes of the present disclosure, one or more of the following abbreviations may apply:
AM Acknowledged Mode
AMD Acknowledged Mode Data
ARQ Automatic Repeat Request
BCCH Broadcast Control CHannel
BCH Broadcast CHannel
C- Control-
CCCH Common Control CHannel
CCH Control CHannel
CCTrCH Coded Composite Transport Channel
CoMP coordinated multi point
CP Cyclic Prefix
CRC Cyclic Redundancy Check
CTCH Common Traffic CHannel
DCCH Dedicated Control CHannel
DCH Dedicated CHannel
DL DownLink
DL-SCH downlink shared channel
DSCH Downlink Shared CHannel
DTCH Dedicated Traffic Channel
DCI Downlink Control Information
FACH Forward link Access CHannel
FDD Frequency Division Duplex L1 Layer 1 (physical layer)
L2 Layer 2 (data link layer)
L3 Layer 3 (network layer)
LI Length Indicator
LSB Least Significant Bit
LTE Long Term Evolution
LTE-A LTE-Advanced or Long Term Evolution-Advanced
MAC Medium Access Control
MBMS Multimedia Broadcast Multicast Service
MBSFN multicast broadcast single frequency network
MCCH MBMS point-to-multipoint Control CHannel
MCE MBMS coordinating entity
MCH multicast channel
MRW Move Receiving Window
MSB Most Significant Bit
MSCH MBMS point-to-multipoint Scheduling Channel (depending on context)
MSCH MBMS control channel (depending on context)
MTCH MBMS point-to-multipoint Traffic CHannel
PBCH Physical Broadcast CHannel
PCCH Paging Control CHannel
PCFICH Physical Control Format Indicator Channel
PCH Paging CHannel
PDCCH physical downlink control channel
PDSCH physical downlink shared channel
PDU Protocol Data Unit
PHICH Physical Hybrid ARQ Indicator CHannel
PHY PHYsical layer
PhyCH Physical Channels
PMCH Physical Multicast Channel
PRACH Physical Random Access Channel
PUCCH Physical Uplink Control Channel
PUSCH Physical Uplink Shared Channel
RACH Random Access CHannel
RLC Radio Link Control
RRC Radio Resource Control
SAP Service Access Point
SDU Service Data Unit
SHCCH SHared channel Control CHannel
SN Sequence Number
SNR signal-to-noise ratio
SUFI SUper FIeld
TCH Traffic CHannel
TDD Time Division Duplex
TFI Transport Format Indicator
TM Transparent Mode
TMD Transparent Mode Data
TTI Transmission Time Interval
U- User-
UE User Equipment
UL UpLink
UM Unacknowledged Mode
UMD Unacknowledged Mode Data
UMTS Universal Mobile Telecommunications System
UTRA UMTS Terrestrial Radio Access
UTRAN UMTS Terrestrial Radio Access Network Long Term Evolution (LTE) is a next-generation evolution of the Universal Mobile Telecommunications System (UMTS), a worldwide protocol family for wireless communications. LTE provides several new technological features compared to previous wireless technologies including OFDM multicarrier transmission, provisions for multiple antennas for both transmit and receive, and an Internet protocol (IP) packet switching network infrastructure. In particular, OFDM relies on a two-dimensional array of orthogonal time and frequency resources which may be aggregated in many flexible ways to provide a wide variety of user services.

In one aspect, a mobile station or mobile terminal that a user carries for wireless communications is known as user equipment (UE). In general, the UE connects to other users either within the wireless network or the general communications infrastructure such as the public switched telephony network (PSTN), Internet, private networks, wide area networks (WANs), etc. via a wireless bidirectional link to an evolved NodeB (eNodeB), also known generically as a base station, which represents the wireless network access node for the UE. Other wireless network elements separate from the access nodes (e.g. eNodeBs) are considered part of the core network (CN). The eNodeB is connected to other network elements such as the serving gateway (S-GW) and the Mobility Management Entity (MME). In one aspect, the S-GW serves as a mobility anchor for data bearers when the UE moves between different eNodeBs. In another aspect, the MME serves as a control entity for managing the signaling between the UE and the core network (CN). The S-GW interfaces with the packet data network gateway (P-GW), which functions as a LTE portal to the global Internet, for example. The P-GW also allocates IP addresses for the UE and enforces quality of service (QoS) based on policy rules.

In one aspect, the downlink resources in LTE are partitioned into smaller elemental time and frequency resources. In one example, in the time dimension, a radio frame has 10 ms duration and is divided into ten subframes, each of 1 ms duration. Furthermore, each subframe is divided into two 0.5 ms slots. In the case of a normal cyclic prefix length, each slot comprises seven OFDM symbols. In the frequency dimension, a Resource Block (RB) is a group of 12 subcarriers each with a subcarrier bandwidth of 15 kHz. A subcarrier is also denoted as a tone, for example. One Resource Element (RE) is the smallest resource unit in LTE which consists of one subcarrier and one OFDM symbol.

In another aspect, certain Resource Blocks are dedicated for special signals such as synchronization signals, reference signals, control signals and broadcast system information. For example, three essential synchronization steps in LTE may be necessary: symbol timing acquisition, carrier frequency synchronization, and sampling clock synchronization. In one example, LTE relies on two special synchronization signals for each cell: the Primary Synchronization Signal (PSS) and the Secondary Synchronization Signal (SSS) which are used for time and frequency synchronization and for broadcasting of certain system parameters such as cell identification, cyclic prefix length, duplex method, etc. In general, the PSS is detected by the UE first, followed by SSS detection.

In one aspect, the PSS is based on a Zadoff-Chu sequence, a constant amplitude chirp-like digital sequence. In general, the PSS is detected non-coherently (i.e., detection without phase information) by the UE since there is assumed to be no a priori channel information available by the UE. In another aspect, the SSS is based on a maximal length sequence (also known as M-sequence). Since the detection of the SSS is performed after the detection of the PSS, if channel state information (CSI) is available to the UE after PSS detection, then coherent detection (i.e., detection with phase information) of the SSS may be available. In certain scenarios, however, non-coherent detection of the SSS may be required, for example, in the case of coherent interference from neighboring eNodeBs.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq $ min {$N_T$, $N_R$}. Each of the $N_S$ independent channels corresponds to a dimension. The MIMO system may provide improved performance (e.g., higher throughput and/or greater reliability) if the additional dimensionalities created by the multiple transmit and receive antennas are utilized.

A MIMO system supports time division duplex (TDD) and frequency division duplex (FDD) systems. In a TDD system, the forward and reverse link transmissions are on the same frequency region so that the reciprocity principle allows the estimation of the forward link channel from the reverse link channel. This enables the access point to extract transmit beamforming gain on the forward link when multiple antennas are available at the access point.

Channel estimation in OFDM wireless system may employ multiple amplitude signaling schemes that track fading radio channels. OFDM is a significant modulation technique for digital communication on mobile multipath fading channels. In one example, to perform coherent demodulation on the received signals it is necessary to have knowledge of the time-varying channel transfer function.

For OFDM systems, the channel transfer function may be conveniently estimated using a two dimensional grid of pilot symbols, that is, over symbol time and discrete frequency tone. The Digital Video Broadcasting Terrestrial (DVB-T) standard is one such example. However, channel capacity is wasted due to the transmission of the pilot symbols in these systems.

One alternative is to use differential phase shift keying (DPSK) and differentially coherent demodulation to obviate the need for channel estimation. For example, DPSK has been successfully implemented in the Digital Audio Broadcasting standard. However, differential detection results in a bit energy to noise density ratio penalty of, for example, approximately 2 dB for an additive white Gaussian network (AWGN) channel and a larger loss for fading channels.

In one aspect, it is desirable to enable coherent demodulation while implementing channel estimation without the need for pilot symbols. One technique, known as blind channel estimation, has been employed, but its performance has not been comparable to that of pilot-based channel estimation.

In one aspect, a channel matrix is used as a model for the channel propagation characteristics between the transmitter and receiver. Channel estimation then refers to the estimation of the parameters of the channel matrix. Most existing techniques for channel estimation use minimum mean square error (MMSE) or least square (LS) techniques. However, these estimation techniques do not take advantage of channel sparsity, thereby resulting in significant performance loss. In one aspect, compressive sensing (CS) techniques may be used to perform channel estimation under the condition of sparsity, that is, when the channel matrix is comprised of mostly zeros.

Thus, it is desirable to derive channel estimation techniques which outperform current non-compressive sensing approaches for both LTE and WiMax systems, especially for high Doppler fading channels and which also requires significantly less pilot symbols.

A high data rate (HDR) subscriber station, referred to herein as an access terminal (AT), may be mobile or stationary and may communicate with one or more HDR base stations, referred to herein as modem pool transceivers (MPTs). An access terminal transmits and receives data packets through one or more model pool transceivers to an HDR base station controller, referred to herein as a model pool controller (MPC). Modem pool transceivers and modem pool controllers are parts of a network called an access network, such as a corporate intranet or the Internet, and may transport data packets between each access terminal and such outside networks. An access terminal that has established an active traffic channel connection with one or more modem pool transceivers may be called an active access terminal, and may be said to be in a traffic state. An access terminal that is in the process of establishing an active traffic channel connection with one or more modem pool transceivers may be in a connection setup state. An access terminal may be any data device that communicates through a wireless channel or through a wired channel, for example, using fiber optic or coaxial cables. An access terminal may further be any of a number of device types including but not limited to a PC card, compact flash device, external or internal modem, or wireless or wireline phone. The communication link through which the access terminal sends signals to the modem pool transceiver is known as a reverse link.

In one aspect, a channel estimation method for OFDM systems based on compressive sensing for wireless systems, such as LTE and WiMax, exhibits superior performance for both narrowband and wideband OFDM systems, using less pilots than existing algorithms. In one example, the channel estimation method uses a delay-Doppler spreading function to model the channel impulse response. In one aspect, the delay-Doppler spreading function, which depends on Doppler frequency and delay, is the Fourier transform of the time-delay channel response, which depends on time and delay.

Figure 4:
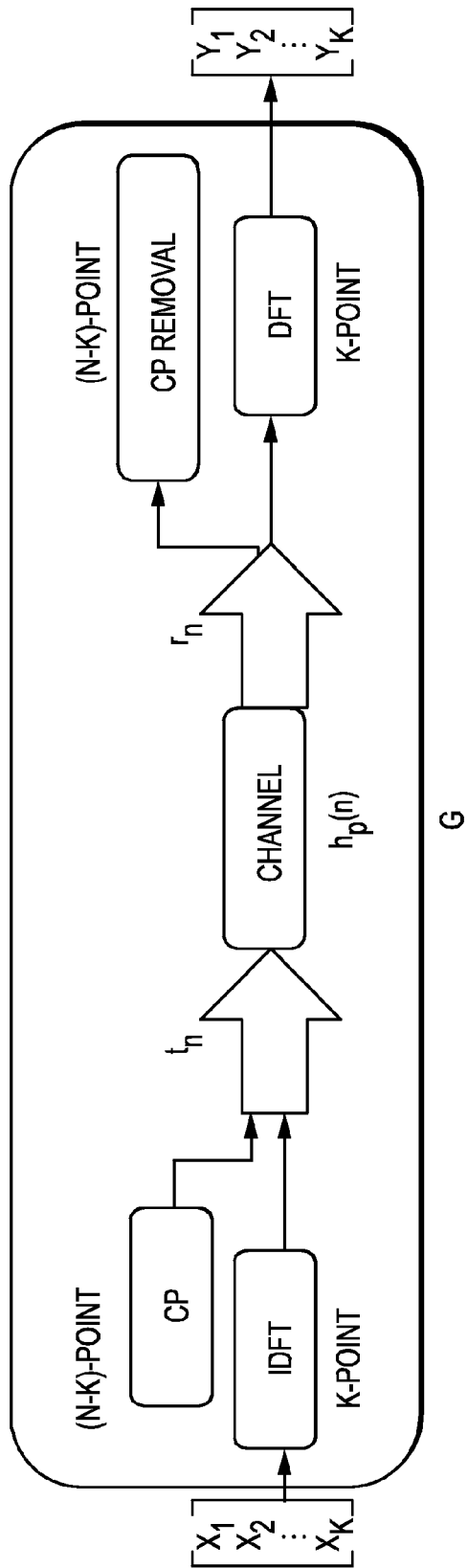
FIG. 4 illustrates an example of a channel model for an orthogonal frequency division multiplexing (OFDM) wireless communication system.

FIG. 4 illustrates an example of a channel model for an orthogonal frequency division multiplexing (OFDM) wireless communication system. In one example, employing a compressive sensing approach to exploit the channel sparsity, which is ignored by existing channel estimation algorithms, results in a channel model shown in FIG. 4 and represented mathematically by equation (1):

$$Y_m = \sum_{k=0}^{K-1} G_{m,k} X_k = G_{m,m} X_m + G_{m,k} X_k \tag{1}$$

As illustrated in FIG. 4, an input signal vector X at a transmitter includes K input tones that are fed to an inverse Discrete Fourier Transform (IDFT) unit to yield an input time series consisting of K input samples. Next, a cyclic prefix (CP) consisting of (N-K) overhead input samples is combined with the input time series to yield a composite input time series $t_n$. The composite input time series is transported over a channel with a time-delay channel response $h_p(n)$ to result in a composite output time series $r_n$ at a receiver. Next, the cyclic prefix is removed at the receiver to produce an output time series consisting of K output samples which are fed to a Discrete Fourier Transform (DFT) unit to yield an output signal vector Y at the receiver which includes K output tones.

In one aspect, the time-delay channel response, for delay path p, $h_p(n)$ may be transformed into a delay-Doppler spreading function $H_p(i)$, for the same delay path p, as shown in equation (2):

$$H_p(i) = \sum_{n=0}^{N-1} h_p(n) e^{-j2\pi n i/N} \tag{2}$$

where p is the path index, n is the delay index, and i is the Doppler spreading index. Hence, by the inverse discrete Fourier transform (IDFT), the inverse transformation is shown in equation (3):

$$h_p(n) = \frac{1}{N} \sum_{i=0}^{N-1} H_p(i) e^{+j2\pi n i/N} \tag{3}$$

In one example, consider a single symbol transmission case. The discrete Fourier transform (DFT) output for output tone m is given as:

$$Y_m = \sum_{k=0}^{K-1} \frac{1}{K} X_k \sum_{n=N-K}^{N-1} \sum_{p=0}^{P-1} h_p(n) e^{-j2\pi kp/K} e^{-j2\pi n(m-k)/K} \quad (4)$$

$$= \sum_{k=0}^{K-1} X_k \frac{1}{K} \sum_{n=N-K}^{N-1} \sum_{p=0}^{P-1} \left\{ \frac{1}{N} \sum_{i=0}^{N-1} H_p(i) e^{+\frac{j2\pi ni}{N}} \right\} e^{-j2\pi kp/K} e^{-j2\pi n(m-k)/K} \quad (5)$$

$$Y_m = \sum_{k=0}^{K-1} X_k G_{m,k} \text{ for } 0 \le m \le K-1 \quad (6)$$

The equivalent channel matrix G now becomes:

$$G_{m,k} = \frac{1}{K} \sum_{n=N-K}^{N-1} \sum_{p=0}^{P-1} \left\{ \frac{1}{N} \sum_{i=0}^{N-1} H_p(i) e^{j2\pi ni/N} \right\} e^{-j2\pi kp/K} e^{-j2\pi n(m-k)/K} \quad (7)$$

In one example, focus on estimating the diagonal of channel matrix G:

$$G_{m,m} = \frac{1}{K} \sum_{n=N-K}^{N-1} \sum_{p=0}^{P-1} \left\{ \frac{1}{N} \sum_{i=0}^{N-1} H_p(i) e^{j2\pi ni/N} \right\} e^{-j2\pi mp/K} \quad (8)$$

Next, assume there are L symbols in a transmitted block. In one aspect, the equivalent channel at 1-th symbol time is:

$$G_{m,m}(l) = \frac{1}{K} \sum_{n=N-K}^{N-1} \sum_{p=0}^{P-1} \left\{ \frac{1}{LN} \sum_{i=0}^{LN-1} H_p(i) e^{j2\pi(n+lN)i/LN} \right\} e^{-j2\pi mp/K} \quad (9)$$

$$G_{m,m}(l) = \quad (10)$$

$$\frac{1}{\sqrt{LK}} \sum_{p=0}^{P-1} e^{-j2\pi mp/K} \sum_{i=0}^{LN-1} e^{j2\pi li/L} \frac{1}{N\sqrt{LK}} \sum_{n=N-K}^{N-1} H_p(i) e^{j2\pi ni/LN}$$

Making the substitution i→i+qL, with i=0, 1, 2, ... L−1 and q=0, 1, 2, ... N−1, the following is obtained:

$$G_{m,m}(l) = \frac{1}{\sqrt{LK}} \sum_{p=0}^{P-1} e^{-j2\pi mp/K} \quad (11)$$

$$\sum_{i=0}^{L-1} e^{+j2\pi li/L} \frac{1}{N\sqrt{LK}} \sum_{q=0}^{N-1} H_p(i+qL) \sum_{n=N-K}^{N-1} e^{j2\pi n(i+qL)/LN}$$

$$= \frac{1}{\sqrt{K}} \sum_{p=0}^{P-1} \frac{1}{\sqrt{L}} \sum_{i=0}^{L-1} G_p(i) e^{j2\pi li/L} e^{-j2\pi mp/K} \quad (12)$$

$$= DFT^{(p \to m)} \{IDFT^{(i \to l)} \{G_p(i)\}\} \quad (13)$$

Figure 5:
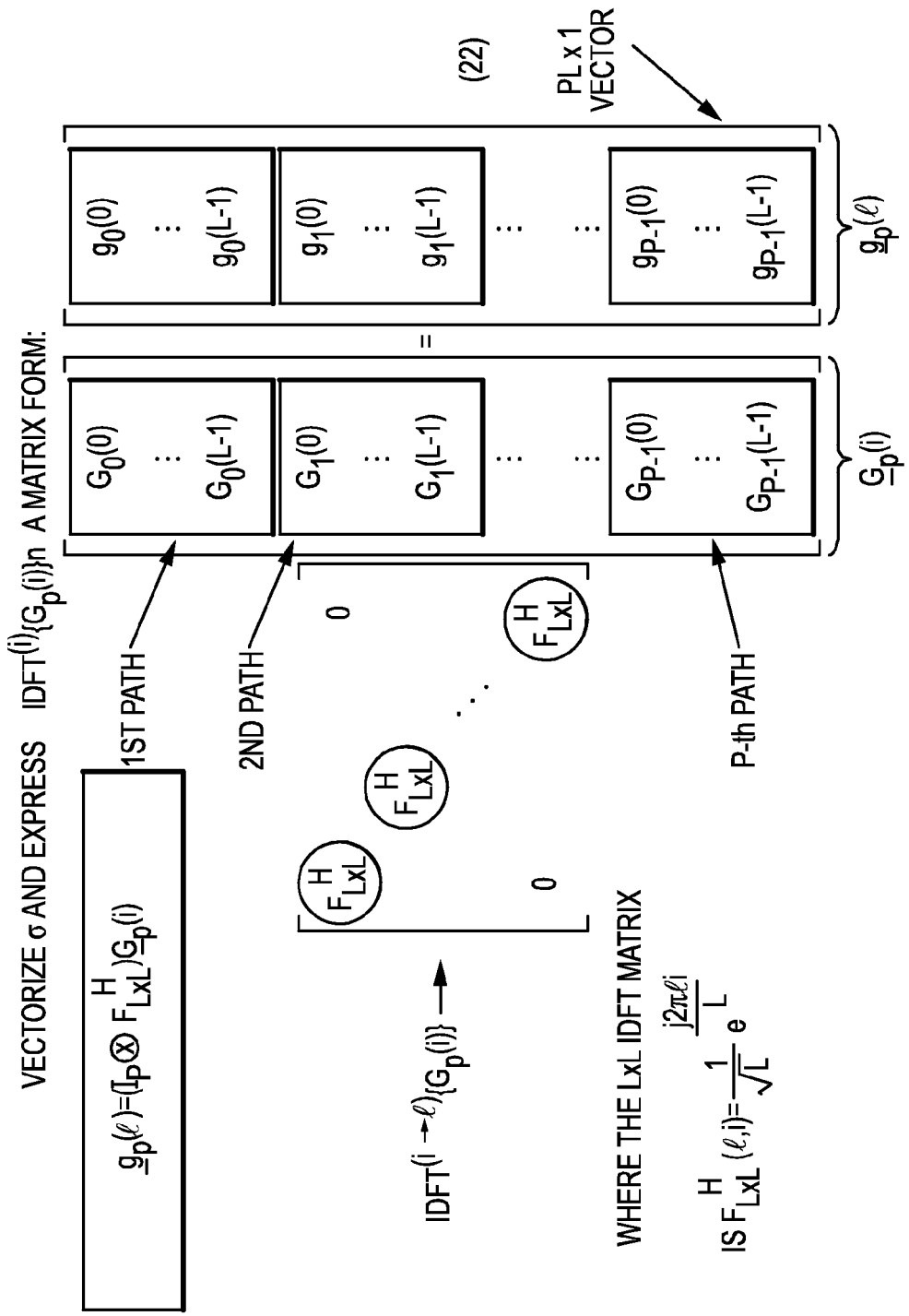
FIG. 5 illustrates an example representation of an inverse discrete Fourier Transform of a channel matrix.

FIG. 5 illustrates an example representation of an inverse discrete Fourier Transform of a channel matrix. In one example, the inverse discrete Fourier transform of the channel matrix $G_p(i)$ may be expressed in a matrix form as shown in FIG. 5.

Hence, the equivalent channel matrix in equation (9) can be represented as:

$$G_{m,m}(l) = DFT^{(p \to m)} \{IDFT^{(i \to l)} \{G_p(i)\}\} = DFT^{(p \to m)} \{g_p(l)\} \quad (14)$$

That is, the DFT may be performed on the taps p of the channel.

Hence, the vectorized matrix G may be represented using the K×P DFT matrix $$F_{K \times P}(m, p) = \frac{1}{\sqrt{K}} e^{j2\pi pm/K}$$

and using the property $(A \otimes B)(C \otimes D) = (AC) \otimes (BD)$, such that $(F_{K \times P} \otimes I_L)(I_P \otimes F_{L \times L}^H) = F_{K \times P} \otimes F_{L \times L}^H$, which yields $$G(l) = (F_{K \times P} \otimes I_L) g_p(l) = (F_{K \times P} \otimes I_L)(I_P \otimes F_{L \times L}^H) G_p(i) = F_{K \times P} \otimes F_{L \times L}^H \cdot G_p(i) = W \cdot G_p(i) \quad (15)$$

From (15), it can be seen that if $G_p(i)$ is known, the frequency domain channel response G(l) can be obtained since W is a known matrix. Equivalently, $G_p(i)$ is the equivalent channel is the delay-Doppler domain.

Figure 6:
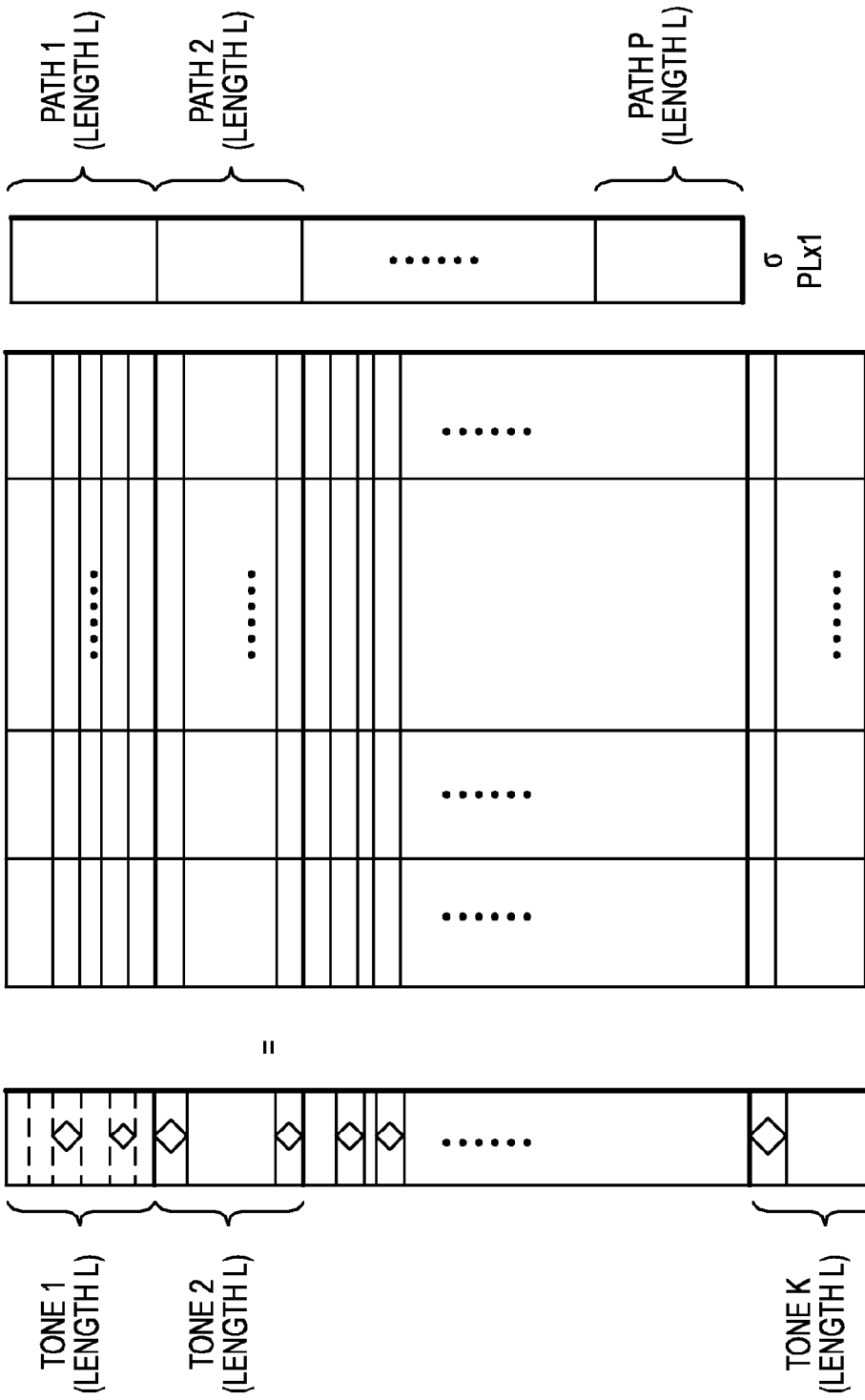
FIG. 6 illustrates an example of a sensing matrix with pilot locations.

FIG. 6 illustrates an example of a sensing matrix with pilot locations. Therefore, we may form the sensing matrix by the pilot locations as indicated in FIG. 6 ($G_p(i)$ is denoted as σ). For example, the equivalent channel matrix $G_p(i)$ may be determined by using a finite number Q of pilots in the matrix G(l). Since $G_p(i)$ is a sparse matrix, compressive sensing methods can be used to estimate $G_p(i)$ from only a small number of known elements, namely pilots, in the matrix G(l).

Figure 7:
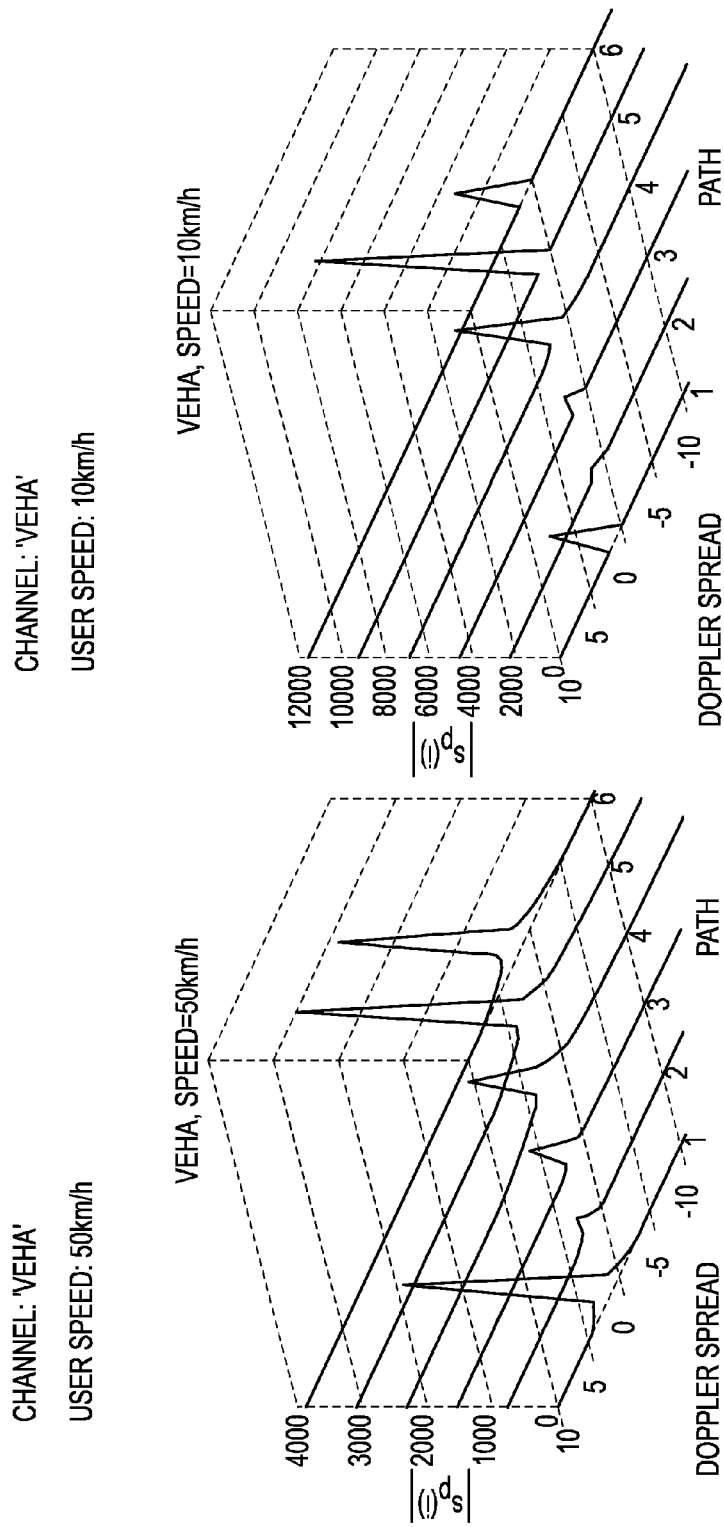
FIG. 7 illustrates an example of a sparse channel in the delay-Doppler domain for two user speed cases.

FIG. 7 illustrates an example of a sparse channel in the delay-Doppler domain for two user speed cases, 50 km/h and 10 km/h. Shown in FIG. 7 are two delay-Doppler response curves with only a few response peaks within the delay-Doppler domain, demonstrating a sparse channel matrix.

In one example, minimizing an L1 norm, based on absolute values, exploits the channel sparsity in the channel matrix while an L2 norm, also known as Euclidean distance, fails. In one aspect, compressive sensing channel estimation based on convex L1 minimization. That is, $$\min \|x\|_1 \Leftrightarrow \min \|\sigma\|_1$$

$$\text{s.t. } y = \Phi x \text{ s.t. } G_{(pilots)} = W_{(sensing)} \sigma$$

In one aspect, the number of pilots and the location of the pilots determine the goodness of the sensing matrix. In one example, the sensing matrix $W_{sensing}$ is a partial Fourier matrix.

Figure 8:
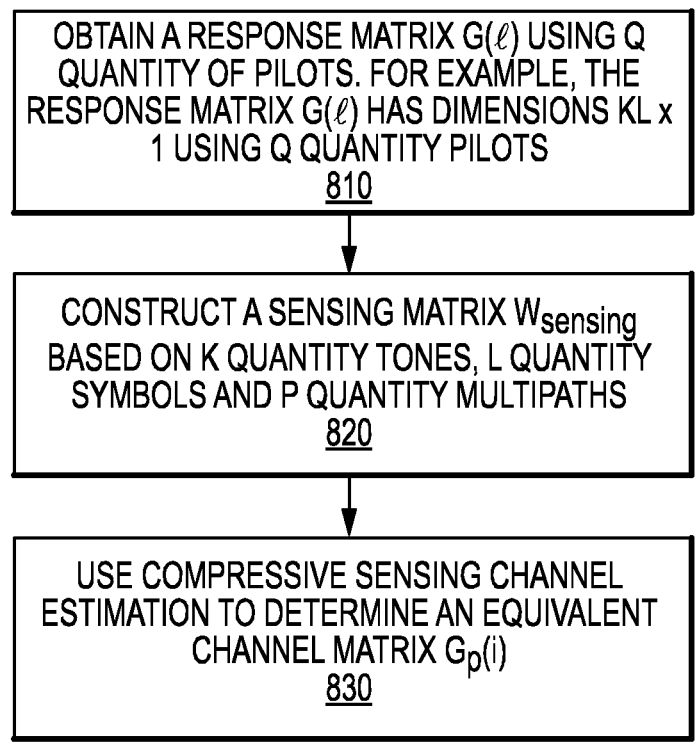
FIG. 8 illustrates an example of a flow diagram for channel estimation using compressive sensing.

FIG. 8 illustrates an example of a flow diagram for channel estimation using compressive sensing. In block 810, obtain a response matrix G(l) using Q quantity of pilots. For example, the response matrix G(l) has dimensions KL×1 using Q quantity pilots. In one example, Q<<LK where K is the number of OFDM tones, and L is the number of symbols. In block 820, construct a sensing matrix $W_{sensing}$ based on K quantity tones, L quantity symbols and P quantity multipaths. In one example the sensing matrix $W_{sensing}$ has dimensions Q×PL, where Q is the number of OFDM pilots in L OFDM symbols, L is the number of symbols, P is the number of multipath components. Notice that $W_{sensing}$ is a partial matrix of W. In block 830, use compressive sensing channel estimation to determine an equivalent channel matrix $G_p(i)$. In one aspect, the compressive sensing channel estimation is based on a convex L1 norm minimization of $G_p(i)$ subject to the constraint that $G_{(pilots)} = W_{(sensing)} G_p(i)$. In one aspect, the channel estimation is for an orthogonal frequency division multiplex (OFDM) system and a cyclic prefix is performed for the OFDM system.

One skilled in the art would understand that the steps disclosed in the example flow diagram in FIG. 8 can be interchanged in their order without departing from the scope and spirit of the present disclosure. Also, one skilled in the art would understand that the steps illustrated in the flow diagram are not exclusive and other steps may be included or one or more of the steps in the example flow diagram may be deleted without affecting the scope and spirit of the present disclosure.

Those of skill would further appreciate that the various illustrative components, logical blocks, modules, circuits, and/or algorithm steps described in connection with the examples disclosed herein may be implemented as electronic hardware, firmware, computer software, or combinations thereof. To clearly illustrate this interchangeability of hardware, firmware and software, various illustrative components, blocks, modules, circuits, and/or algorithm steps have been described above generally in terms of their functionality. Whether such functionality is implemented as hardware, firmware or software depends upon the particular application and design constraints imposed on the overall system. Skilled artisans may implement the described functionality in varying ways for each particular application, but such implementation decisions should not be interpreted as causing a departure from the scope or spirit of the present disclosure.

For example, for a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described therein, or a combination thereof. With software, the implementation may be through modules (e.g., procedures, functions, etc.) that perform the functions described therein. The software codes may be stored in memory units and executed by a processor unit. Additionally, the various illustrative flow diagrams, logical blocks, modules and/or algorithm steps described herein may also be coded as computer-readable instructions carried on any computer-readable medium known in the art or implemented in any computer program product known in the art.

In one or more examples, the steps or functions described herein may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Figure 9:
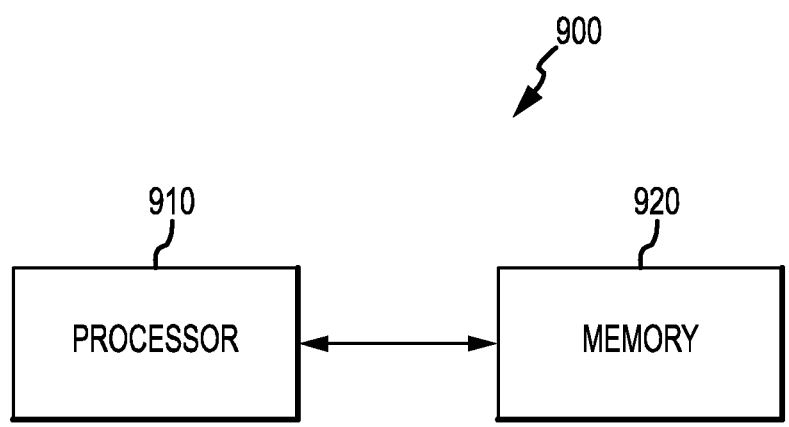
FIG. 9 illustrates an example of a device comprising a processor in communication with a memory for executing the processes for channel estimation using compressive sensing.

In one example, the illustrative components, flow diagrams, logical blocks, modules and/or algorithm steps described herein are implemented or performed with one or more processors. In one aspect, a processor is coupled with a memory which stores data, metadata, program instructions, etc. to be executed by the processor for implementing or performing the various flow diagrams, logical blocks and/or modules described herein. FIG. 9 illustrates an example of a device 900 comprising a processor 910 in communication with a memory 920 for executing the processes for channel estimation using compressive sensing. In one example, the device 900 is used to implement the algorithm illustrated in FIG. 8. In one aspect, the memory 920 is located within the processor 910. In another aspect, the memory 920 is external to the processor 910. In one aspect, the processor includes circuitry for implementing or performing the various flow diagrams, logical blocks and/or modules described herein.

Figure 10:
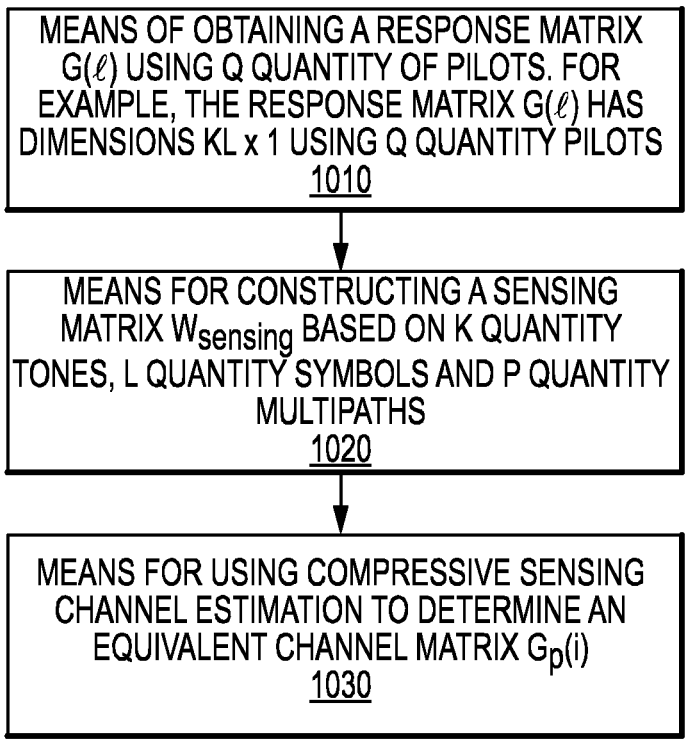
FIG. 10 illustrates an example of a device suitable for channel estimation using compressive sensing.

FIG. 10 illustrates an example of a device 1000 suitable for channel estimation using compressive sensing. In one aspect, the device 1000 is implemented by at least one processor comprising one or more modules configured to provide different aspects of for channel estimation using compressive sensing as described herein in blocks 1010, 1020 and 1030. For example, each module comprises hardware, firmware, software, or any combination thereof. In one aspect, the device 1000 is also implemented by at least one memory in communication with the at least one processor.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure.

The invention claimed is:

1. A method for channel estimation comprising:
obtaining a response matrix G(l) using Q quantity pilots;
constructing a sensing matrix $W_{sensing}$ based on K quantity tones, L quantity symbols and P quantity multipaths; and
using compressive sensing channel estimation to determine an equivalent channel matrix $G_p(i)$ based on the response matrix G(l) and the sensing matrix $W_{sensing}$.

2. The method of claim 1 wherein the compressive sensing channel estimation is based on a L1 norm minimization of the equivalent channel matrix Gp(i) with a constraint that G(l)= $W_{sensing}$ Gp(i).

3. The method of claim 2 wherein the channel estimation is for an orthogonal frequency division multiplex (OFDM) system.

4. The method of claim 3 further comprising performing a cyclic prefix for the OFDM system.

5. The method of claim 3 wherein the OFDM system is either a long term evolution (LTE) wireless system or a WiMax wireless system.

6. The method of claim 1 wherein the sensing matrix $W_{sensing}$ is a partial Fourier matrix.

7. The method of claim 1 wherein the equivalent channel matrix $G_p(i)$ is a delay Doppler spreading function.

8. The method of claim 2 wherein the Q quantity pilots are based on the L symbols and a subset of the K quantity tones.

9. The method of claim 8 wherein Q is much less than K.

10. The method of claim 2 wherein the L1 norm minimization is a convex L1 norm minimization.

11. An apparatus for channel estimation comprising a processor and a memory, the memory containing program code executable by the processor for performing the following:
obtaining a response matrix G(l) using Q quantity pilots;
constructing a sensing matrix $W_{sensing}$ based on K quantity tones, L quantity symbols and P quantity multipaths; and
using compressive sensing channel estimation to determine an equivalent channel matrix $G_p(i)$ based on the response matrix G(l) and the sensing matrix $W_{sensing}$.

12. The apparatus of claim 11 wherein the compressive sensing channel estimation is based on a L1 norm minimization of the equivalent channel matrix $G_p(i)$ with a constraint that $G(l)=W_{sensing} G_p(i)$.

13. The apparatus of claim 12 wherein the apparatus is part of an orthogonal frequency division multiplex (OFDM) system.

14. The apparatus of claim 13 wherein the memory further comprising program code for performing a cyclic prefix for the OFDM system.

15. The apparatus of claim 13 wherein the OFDM system is either a long term evolution (LTE) wireless system or a WiMax wireless system.

16. The apparatus of claim 11 wherein the sensing matrix $W_{sensing}$ is a partial Fourier matrix.

17. The apparatus of claim 11 wherein the equivalent channel matrix $G_p(i)$ is a delay Doppler spreading function.

18. The apparatus of claim 12 wherein the Q quantity pilots are based on the L symbols and a subset of the K quantity tones.

19. The apparatus of claim 18 wherein Q is much less than K.

20. The apparatus of claim 12 wherein the L1 norm minimization is a convex L1 norm minimization.

21. An apparatus for channel estimation comprising:
means for obtaining a response matrix G(l) using Q quantity pilots;
means for constructing a sensing matrix $W_{sensing}$ based on K quantity tones, L quantity symbols and P quantity multipaths; and
means for using compressive sensing channel estimation to determine an equivalent channel matrix Gp(i) based on the response matrix G(l) and the sensing matrix $W_{sensing}$.

22. The apparatus of claim 21 wherein the compressive sensing channel estimation is based on a L1 norm minimization of the equivalent channel matrix $G_p(i)$ with a constraint that $G(l)=W_{sensing} G_p(i)$.

23. The apparatus of claim 22 wherein the apparatus is part of an orthogonal frequency division multiplex (OFDM) system.

24. The apparatus of claim 23 further comprising means for performing a cyclic prefix for the OFDM system.

25. The apparatus of claim 23 wherein the OFDM system is either a long term evolution (LTE) wireless system or a WiMax wireless system.

26. The apparatus of claim 21 wherein the sensing matrix $W_{sensing}$ is a partial Fourier matrix.

27. The apparatus of claim 21 wherein the equivalent channel matrix $G_p(i)$ is a delay Doppler spreading function.

28. The apparatus of claim 22 wherein the Q quantity pilots are based on the L symbols and a subset of the K quantity tones.

29. The apparatus of claim 28 wherein Q is much less than K.

30. The apparatus of claim 22 wherein the L1 norm minimization is a convex L1 norm minimization.

31. A non-transitory computer-readable medium for channel estimation, the computer-readable medium storing a computer program, wherein execution of the computer program is for:
obtaining a response matrix G(l) using Q quantity pilots;
constructing a sensing matrix $W_{sensing}$ based on K quantity tones, L quantity symbols and P quantity multipaths; and
using compressive sensing channel estimation to determine an equivalent channel matrix $G_p(i)$ based on the response matrix G(l) and the sensing matrix $W_{sensing}$.

32. The non-transitory computer-readable medium of claim 31 wherein the compressive sensing channel estimation is based on a L1 norm minimization of the equivalent channel matrix $G_p(i)$ with a constraint that $G(l)=W_{sensing} G_p(i)$.

33. The non-transitory computer-readable medium of claim 32 wherein the channel estimation is for an orthogonal frequency division multiplex (OFDM) system.

34. The non-transitory computer-readable medium of claim 33 wherein execution of the computer program is also for performing a cyclic prefix for the OFDM system.

35. The non-transitory computer-readable medium of claim 33 wherein the OFDM system is either a long term evolution (LTE) wireless system or a WiMax wireless system.

36. The non-transitory computer-readable medium of claim 31 wherein the sensing matrix $W_{sensing}$ is a partial Fourier matrix.

37. The non-transitory computer-readable medium of claim 31 wherein the equivalent channel matrix $G_p(i)$ is a delay Doppler spreading function.

38. The non-transitory computer-readable medium of claim 32 wherein the Q quantity pilots are based on the L symbols and a subset of the K quantity tones.

39. The non-transitory computer-readable medium of claim 38 wherein Q is much less than K.

40. The non-transitory computer-readable medium of claim 32 wherein the L1 norm minimization is a convex L1 norm minimization.

* * * * *